March 11, 1952 R. W. HONNIG ET AL 2,588,838
BLOCK MOLDING APPARATUS
Filed July 8, 1946
Fig. 2.
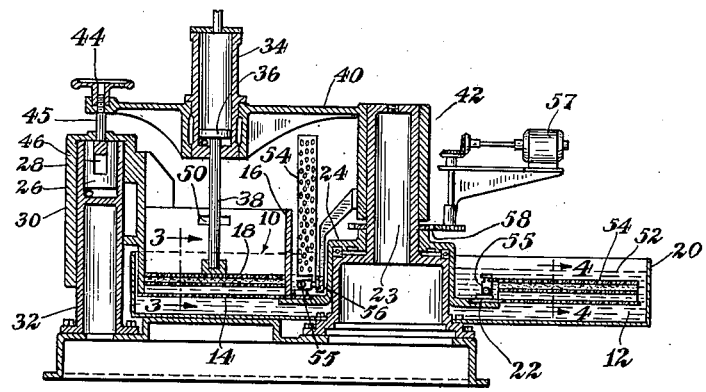
Fig. 1.
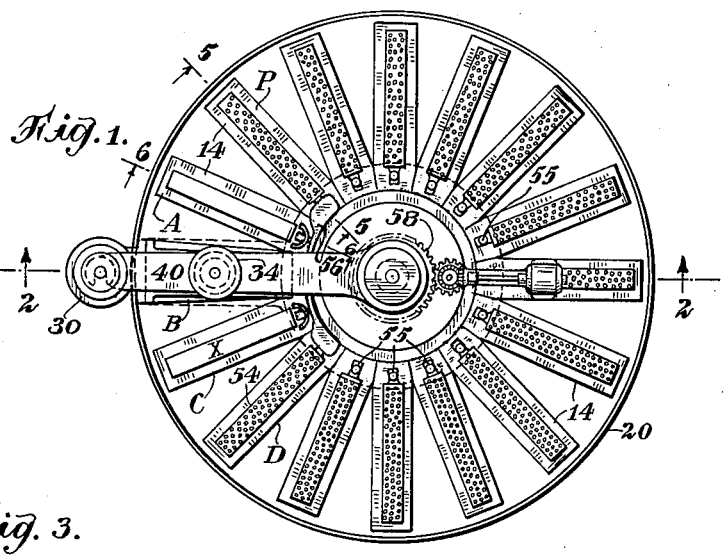
Fig. 3.
Fig. 4.
Fig. 6.
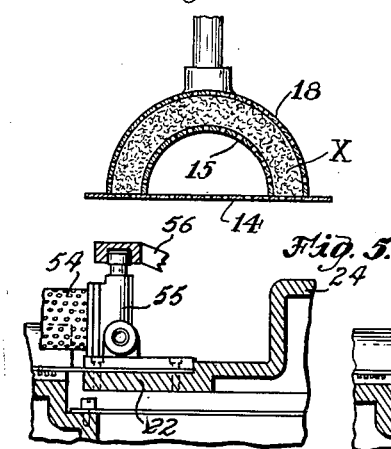
Fig. 5.
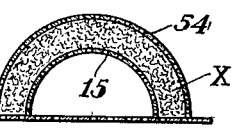
INVENTORS.
Roland W. Honnig.
BY Louis A. Hawthorne.
Virgil C. Kline
ATTORNEY.

Patented Mar. 11, 1952

2,588,838

UNITED STATES PATENT OFFICE 2,588,838

BLOCK MOLDING APPARATUS

Roland W. Honnig, Plainfield, and Louis A. Hawthorne, Hillside, N. J., assignors to Johns-Manville Corporation, New York, N. Y., a corporation of New York Application July 8, 1946, Serial No. 682,020

3 Claims. (Cl. 92—59)

This invention relates to molding apparatus, and is particularly concerned with improvements in molding apparatus for forming blocks from aqueous slurry batches of hydraulic setting materials.

Molding units heretofore used for molding blocks from aqueous slurry suspensions of hydraulic setting materials have employed a large number of individual molds or mold parts. Each mold or mold part is shaped and dimensioned to conform with the shape and dimensions of the desired block, and each mold or mold part is in use during the molding operation and for a substantial period thereafter while the block is undergoing a preliminary set and while the mold is being dismantled and reassembled to begin another molding cycle. Since each such operation normally requires the molding of blocks of many different sizes, a substantial capital outlay has been required to supply the large number of molds and mold sizes required.

The apparatus of the present invention has been developed as an improvement over the "Molding and Curing Apparatus" which is described in the abandoned patent application of Roland W. Honnig, Serial No. 617,520, filed September 20, 1945.

The block molding apparatus of the Honnig application comprises a three-part demountable mold, together with a plurality of duplicate mold base members and duplicate mold top elements which are employed respectively to support and to at least partially confine the soft block during a preliminary curing operation. Each of the mold base members is mounted on an endless conveyor, and each of the duplicate mold top members may also be mounted on a second conveyor. The mold side wall member is mounted independently of the base and top members, and is relatively reciprocable with respect thereto in a path which lies at right angles with and intersects the path traversed by the mold base members.

An object of the present invention is to provide molding apparatus of the general type forming the subject of the aforementioned Honnig application, but which employs a relatively much smaller number of individual filter mold parts for producing a comparable number of blocks and block sizes, following a definite molding and curing cycle.

A further object is to provide block molding and curing apparatus of this general type in which the mold parts and any duplicates thereof are mounted in easily accessible and removable relation for rapid dismantling and reassembly of substitute parts for molding different sizes.

With the aforementioned objects and features in view, the invention consists in the block molding apparatus which is hereinafter described and more particularly defined by the appended claims.

In the following description reference will be made to the accompanying drawings, in which:

Fig. 1 is a diagrammatic plan view illustrating an assembly of the principal apparatus elements of the present invention;

Fig. 2 is a vertical section of the filter mold elements of the apparatus, taken on the plane 2—2 of Fig. 1;

Fig. 3 is an enlarged cross-section of the closed mold, taken on the line 3—3 of Fig. 2;

Fig. 4 is an enlarged cross-section of the molded block and its supporting and confining elements, taken on the line 4—4 of Fig. 2;

Fig. 5 is an enlarged broken vertical section portraying the removable block cover plate actuating mechanism, taken on the plane 5—5 of Fig. 1; and Fig. 6 is an enlarged broken vertical section portraying the removable block plate actuating mechanism at the position assumed just prior to, during and immediately after molding, taken on the plane 6—6 of Fig. 1.

The apparatus which is illustrated is particularly adapted for molding lightweight blocks from aqueous slurries of reinforcing fibers such as asbestos or mineral wool and hydraulic setting material such as heat-convertible normal magnesium carbonate, or reactive proportions of finely divided silica and hydrated lime. The apparatus has been designed for substantially continuous or semi-continuous and rapid pressure filter molding and initial setting or heat curing operations. The apparatus includes means for introducing an aqueous slurry charge of measured solids content and predetermined consistency into a filter mold 10 wherein the charge solids are partially dewatered and shaped under mechanical pressure to final block form and dimensions. The thus molded wet solids block is immediately released from the mold top and side walls and advanced in stages, while supported by the mold base, through a zone in which the block is given a preliminary set or heat curing treatment, as by direct contact immersion within a bath 12 of hot water, to develop a shape retaining set. Final cure and set takes place while drying or otherwise heat treating the block after its removal from the apparatus which is portrayed in the drawing.

The principal elements of the mold 10 (Fig. 2)

include a water pervious and solids impervious mold base plate 14, a mold charging cylinder 16 which is relatively movable with respect to the base plate and the walls of which form side walls of the mold, and a piston 18 which is reciprocably mounted within the cylinder 16 and which is water pervious and solids impervious and forms a filtering top for the mold.

The molding and preliminary setting or heat curing operations take place beneath the surface of water bath 12 within a tank 20 having an open top. A circular platform or turntable 22 is mounted within tank 20 for continuous or intermittent rotation about an axial supporting column 23. The raised central section of the turntable is rotatably supported by a circular ball bearing 24. The turntable carries on its top surface a plurality of mold base plates 14 disposed in radial positions, as shown in Fig. 1. Each of the mold base plates 14 serves at only one position B in its path of travel as the base element of the variable volume filter mold 10. In subsequent positions of forward advance by the turntable the mold base plates support soft molded blocks while the blocks are developing a preliminary shape retaining set.

The mold 10 which is illustrated is designed for molding semi-cylindrical pipe covering shapes or blocks. The mold base members 14 which are mounted on turntable 22 consist of water pervious, solids impervious plates each of which has a convex, semi-cylindrical raised center or core 15 (Fig. 3) having the same radius as the OD radius of the pipe to be covered, such core extending longitudinally throughout the length of the plate 14. The plates and raised centers may be perforate and faced with fine screen. The top surface of each plate and its raised central portion conforms to the dimensions of the concave face portion of the desired insulation block. The piston 18 for the mold comprises a concave semi-cylindrical water pervious, solids impervious plate which has the same dimensions and shape as the convex face of the desired semi-cylindrical block or pipe covering. This piston may also be a perforate plate faced with fine mesh screen. The final dimensions of the block are imparted during the molding operation when the piston 18 reaches the end of its downward stroke in cylinder 16, as portrayed in Figs. 2 and 3. The total face area of base plate 14 may be larger than the block base dimensions in order to provide a seat on the top face of the plate for the bottom end of charging cylinder 16.

Means are shown for reciprocating the charging cylinder through a short vertical path aligned with one of the mold base plates 14 at position B. This means includes a piston 26 reciprocably mounted in a hydraulic pump 28. Vertical movement of piston 26 within the cylinder of pump 28 raises and lowers an inverted guide sleeve 30 which is integral with, or coupled to, the walls of cylinder 16. Cylinder 16 and its actuating mechanism are supported and guided by a frame including an upright column 32.

Piston 18 is reciprocated within cylinder 16 by actuating mechanism including a hydraulic cylinder 34 and a piston 36 mounted within said cylinder and connected to piston 18 by a piston rod 38. For ease in dismantling mold 10 and for changing the dimensions of the mold cylinder 16 and piston 18, independent supports are provided for the cylinder and piston. The supporting element for the piston 18 has been shown as a beam 40 which extends outwardly from a collar 42.

The collar 42 is in turn rotatably journaled on the axial supporting column 23 of the turntable. To secure central alignment of the piston 18 and cylinder 16, the unsupported end of beam 40 may be clamped in molding position by a clamping nut 44 engaging a threaded stem 45 which is centered within an aperture in the end wall of sleeve 30 and within a slot 46 in the upper end of piston 26.

While not illustrated, it will be understood that the charging cylinder 16 may remain in a stationary position throughout a molding cycle, while the turntable 22 is periodically reciprocated to raise and lower that one of the mold base elements 14 which has been rotated to molding position B through a short vertical path sufficient to form a tight sealing seat against the base of the cylinder 16.

After a molding cycle has been completed, a wet molded block X is released from the mold by either elevating the cylinder 16, or by lowering the turntable away from the base of the cylinder. Turntable 22 then advances the block X while supported by the mold base element 14 on which the block was originally formed, successively through positions C, D, etc. In all of these positions B, C, D, etc., the molded block is immersed below the top level 52 of the hot water bath 12 in tank 20. In some cases it is desirable to confine the top surface of the block X throughout a major portion of its advance through the circular path of travel of the turntable within the hot water curing bath, as a means for preventing formation of gas pockets within the block and blisters at the top face of the block caused by rapid and non-uniform escape of $CO_2$ gas from the block during the preliminary curing period. This result is secured by applying a water and gas pervious and solids impervious plate 54 to the top surface of the block shortly after its release from the mold, for example at position D, and by retaining such plate 54 in position on the block until the block reaches a suitably cured state at an advanced position in its path, for example at that position designated P. Plate 54 may have approximately the same dimensions and semi-cylindrical shape as the piston 18. A number of confining plates 54 may be applied and maintained in position at the top surfaces of the blocks X undergoing set or cure by mounting them on pivoted posts 55 which travel with the turntable. Each post is engaged at position P by a guide rail 56 (Fig. 5) and forced thereby to swing a supported plate 54 to vertical position (Fig. 6) while passing cylinder 16 (Fig. 2), after which the plate is swung back to cover a freshly molded block at position D.

By the time that one of the mold base elements 14 reaches position P in its circular path within tank 20, the block X which it supports has been set or cured to a shape retaining set, and mechanism (not shown) is provided which is operative at position A for lifting the cured block off its support 14 and transferring it to a pallet on which the still wet block may be transported through a conventional air dryer wherein final curing and drying of the molded block takes place. The mechanism for lifting the block off the plate 14 at position A may comprise a suction cup which is mounted on a hinged arm as shown in the aforementioned Honnig application, Serial No. 617,520, now abandoned.

Actuating mechanism is provided for moving turntable 22 continuously or intermittently in a horizontal circular path. Such mechanism may comprise an electric motor 57 which is connected by shaft and gear coupling to an annular gear unit 58 on the centrally raised portion of the turntable.

In operation for producing low density magnesia insulation blocks, a dilute slurry containing normal magnesium carbonate and 10-20% asbestos fibers is first formed and conditioned to a suitable consistency for molding. A measured charge of this pre-conditioned slurry is introduced to mold 10 through a port 50. During this charging operation the piston 18 is at the top of its stroke in cylinder 16 and the base of the cylinder is seated in tight sealing relation against the top face of one of the mold base plates at position B in its path of travel. At the time of charging the mold the top level of the water bath in tank 20 is several inches above the level of the base plate.

As the mold is charged with slurry, hot water is displaced from the mold through the water pervious base 14. As soon as the measured charge has entered the mold the piston is forced downwardly, thereby applying mechanical pressure to the mold charge and effecting partial dewatering of the wet solids content of the charge through the water pervious mold base and through the descending piston. The screen or other perforations in the mold base and piston are sufficiently fine to prevent loss of finely divided solids. At the beginning of the piston downstroke the mold charge is under zero pressure. However, after the downstroke begins this pressure may be built up rapidly to hasten dewatering of the charge and to shorten the length of the molding cycle. Pressures as high as 100 lbs. per square inch of piston surface area may be safely employed during the downstroke. At the end of the downward stroke of the piston the pressure on the mold charge falls to substantially zero. On completion of the molding cycle a predetermined weight of wet slurry solids has been compressed into a wet solids block X having the precise form and dimensions of the desired insulating block. The molding cycle may be completed within a short period of say 20 seconds.

The initial step in releasing a wet solids block from mold 10 consists of separating cylinder 16 from its seat against the top surface of the mold base, to break any suction seal and to free the lateral sides of the wet solids block from contact with the sides of the cylinder. This vertical separation of the cylinder from the mold base is initiated prior to raising the piston away from its forward position in confining contact with the upper surface of the wet solids block. After both the cylinder and the piston have been raised to positions freeing the block X from their confining surfaces, the turntable is operated to advance the thus formed wet solids block to a position C, while at the same time advancing another mold base from position A to position B as a preliminary to the beginning of another molding cycle. As soon as an empty mold base has been thus advanced to position B, the mold 10 is again closed by either lowering the cylinder to seating position against the top surface of the base, or by raising the base and that portion of the conveyor which supports the base to bring the base into abutting tight sealing relation against the bottom of the cylinder. After the mold has thus been closed and the piston raised to the top of its vertical stroke, another charge of prereacted slurry is introduced to the mold and the molding cycle is repeated.

After the conveyor is operated to advance a molded wet block from position C to a position D, the water pervious and solids impervious confining plate cover 54 is applied to the top surface of the block and is kept in place thereon during further stages of advance of the block through the hot water curing section of the apparatus. With the temperature of the water in the bath at about 180-200° F., this curing cycle may be completed within a period of 5-10 minutes to a point at which the block has developed sufficient shape retaining set to withstand fairly rough handling.

The apparatus is designed for easy and rapid removal and replacement of mold parts to adapt it for molding blocks of different sizes. By independently mounting the mold charging cylinder and its actuating mechanism and the piston and its actuating mechanism, it is possible to swing the piston and cylinder apart to allow for their rapid replacement by another cylinder-piston assembly. By employing a rotary turntable or equivalent set of radiating arms supported by the central shaft 23, the number of mold base plates or cores is reduced to a minimum. By mounting the mold base elements radially on the top of the turntable without any fastening other than rapidly replaceable clamps or pins for centering the base plates or cores in proper position, it is possible to effect rapid replacement of base plates or cores in changing from molds of one size to another.

The invention which has been thus described by detailed example is not limited as to such details and it is to be understood that variations, changes and modifications are contemplated within the scope of the invention as defined by the following claims.

What we claim is:

1. In block molding and curing apparatus, a water curing tank, a water pervious and solids impervious filter mold base within the tank, a charging cylinder mounted over a charging position of said mold base, the bottom of said cylinder being shaped and dimensioned to seat with a tight sealing fit to the mold base, said charging cylinder being reciprocable relative to said mold base in a fixed vertical path, a water pervious and solids impervious piston reciprocably mounted in said cylinder, said mold base, charging cylinder and piston forming in combination a filter mold the volume of which varies with the piston position, and a rotary turntable arranged to support the mold base at the mold charging position and in subsequent curing positions, said tank being arranged to maintain a body of hot water at an immersion level above a molded block on the mold base.

2. In block molding and curing apparatus, a retaining tank for a liquid curing bath, a turntable mounted for rotation within the tank about an axial supporting column, a plurality of water pervious solids impervious block supporting elements disposed in uniformly spaced radial positions on the turntable for rotation therewith in a circular horizontal path, each of said elements serving at one position in its rotation path as a filter mold base, a mold charging cylinder vertically aligned with that element forming the mold base, said cylinder being reciprocable in a fixed vertical path, and a water pervious solids impervious piston top for the mold mounted to reciprocate within said cylinder, said piston and its actuating mechanism being independently mounted on the turntable supporting column for ready disengagement from the cylinder and its actuating mechanism, and said tank being arranged to maintain curing liquid at an immersion level over molded blocks carried by the supporting elements.

3. In block molding and curing apparatus, a retaining tank for curing liquid, a rotary turntable mounted for rotation within the tank about an axial supporting column, a plurality of water pervious solids impervious combination filter mold base and block supporting elements disposed in uniformly spaced radial positions on the turntable for intermittent rotation therewith in a circular horizontal path, a charging cylinder mounted over a charging position of one of said mold base elements, said charging cylinder being reciprocable with respect to said one of said mold base elements in a fixed vertical path, a water pervious and solids impervious piston reciprocably mounted in said cylinder, said mold base, charging cylinder and piston forming in combination a variable volume filter mold, a plurality of water pervious solids impervious confining plates each pivotally mounted in spaced radial relation on the turntable and each having the shape and dimensions of the piston, and guide means operable for lowering each plate over the top of a molded block after its release from the mold and for retaining said plate in said position throughout a major portion of the path of rotation of the turntable and then raising the plate to release the molded and cured block.

ROLAND W. HONNIG.
LOUIS A. HAWTHORNE.

REFERENCES CITED

The following references are of record in the file of this patent:

UNITED STATES PATENTS

| Number | Name | Date |
| --- | --- | --- |
| 1,806,024 | Russell et al. | May 19, 1931 |
| 2,298,391 | Lewis | Oct. 13, 1942 |
| 2,346,608 | Randal | Apr. 11, 1944 |
| 2,368,975 | Dinkfeld | Feb. 6, 1945 |
| 2,369,488 | Perry | Feb. 13, 1945 |
| 2,380,942 | Chaplin | Aug. 7, 1945 |
| 2,413,958 | Dinkfeld et al. | Jan. 7, 1947 |
| 2,481,486 | Abbott | Sept. 13, 1949 |

FOREIGN PATENTS

| Number | Country | Date |
| --- | --- | --- |
| 455,601 | Great Britain | Oct. 19, 1936 |